Aug. 5, 1924.
P. SCHULZ ET AL
1,503,809
CHUCK WITH WEDGE JAWS
Filed Feb. 28, 1922
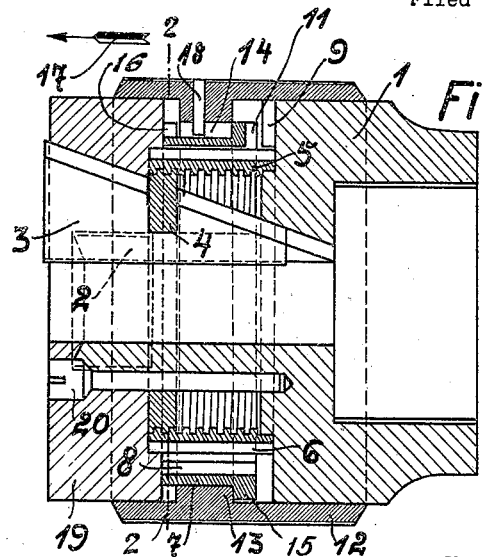
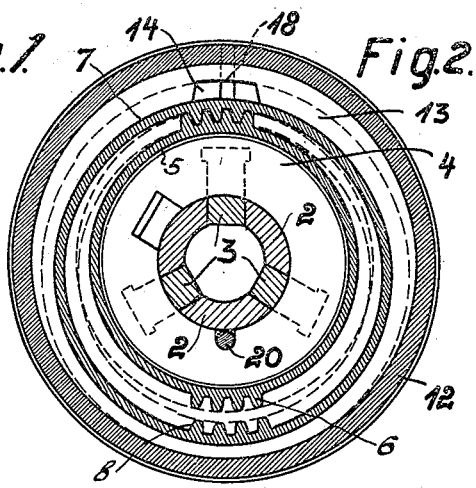
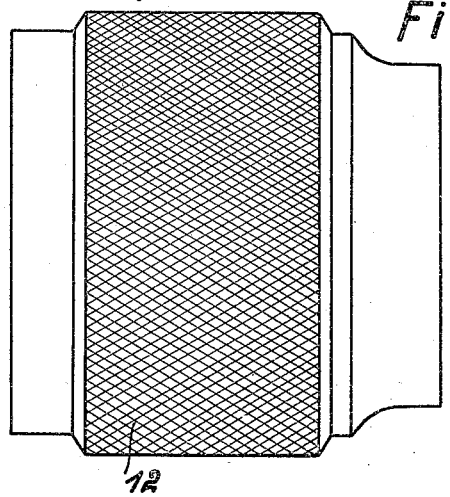
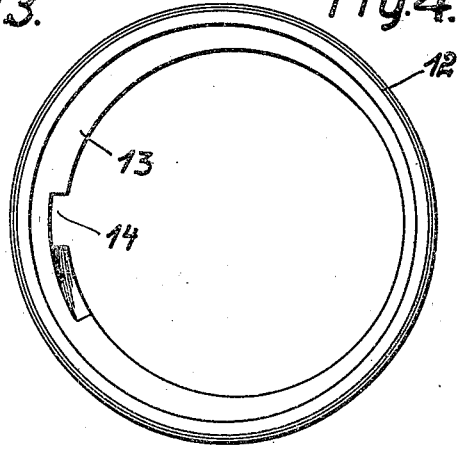
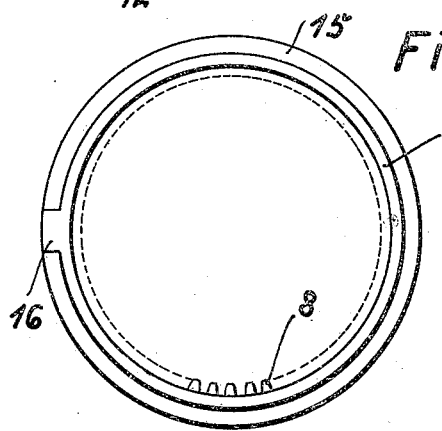
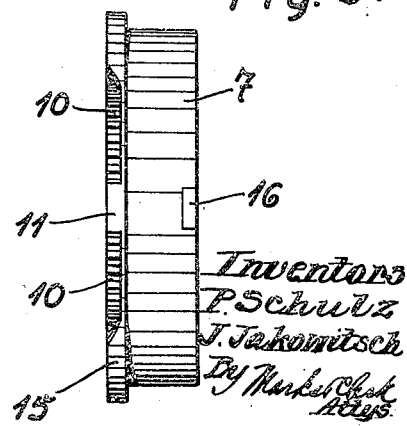
Inventors
P. Schulz
J. Jakowitsch Patented Aug. 5, 1924.

1,503,809

UNITED STATES PATENT OFFICE.

PAUL SCHULZ, OF BODENBACH-ON-THE-ELBE, AND JULIUS JAKOWITSCH, OF KOMOTAU, CZECHOSLOVAKIA.

CHUCK WITH WEDGE JAWS.

Application filed February 28, 1922. Serial No. 539,967.

*To all whom it may concern:*

Be it known that we, PAUL SCHULZ and JULIUS JAKOWITSCH, citizens, respectively, of the German Republic and the Austrian Republic, and residing at Bodenbach-on-the-Elbe and Komotau, Czechoslovakia, have invented certain new and useful Improvements in Chucks with Wedge Jaws, of which the following is a specification.

This invention relates to a chuck with wedge jaws capable of exerting considerable pressure with the application of little force, the wedge jaws being adapted to be removed from the chuck and exchanged without necessitating the complete disassembling of the chuck, so that one and the same chuck may be used for holding rods of various diameters.

In order that the invention may be clearly understood the same will be described with references to the accompanying drawings in which similar characters of reference are employed in all of the views and wherein:

Fig. 1 is the form of construction of the chuck in longitudinal section,

Fig. 2 is a cross section on line 2—2 of Fig. 1,

Fig. 3 is a side elevation of the arrangement shown in Fig. 1,

Figs. 4 and 5 show each in plan view a constructional detail, and

Fig. 6 the side elevation of the arrangement shown in Fig. 5.

Referring now, more particularly, to the drawings the main part or body 1 of the chuck is reduced at 2 and slotted to receive the wedge shaped clamping jaws 3. The reduced portion serves at the same time to guide the disk 4 the latter producing the movement of the clamping jaws 3. The clamping jaws are provided with incisions which are engaged by the disk 4, the latter being displaced axially by rotation of the nut 5 which also acts to simultaneously displace the jaws axially and move them either inwardly or outwardly. In order to facilitate the turning of the nut 5 the latter is provided with teeth 6 in the outer surface and is surrounded by a ring 7 provided in turn with inner teeth 8. The inner diameter of the ring 7 is slightly larger than the outer diameter of the nut 5 so that these two parts have a different number of teeth. For instance, the nut 5 may be provided with sixty teeth and the ring 7 with sixty-four teeth. These two parts act in the manner of an eccentric drive. The main part 1 has a nose 9 which is designed to engage with the incisions 10 on the ring 7 and act upon the shoulder 11 formed at the time the incisions are made.

An outer sleeve 12 surrounding the main part or body 1 and adapted to be turned with regard to the main part is provided internally with an eccentric rib 13 in turn having an incision 14 therein. This eccentric rib fits exactly between the flange 15 and the projection 16 of the ring 7 so that the ring may be displaced in both directions parallel to the middle line of the chuck by the axial displacement of the sleeve 12 provided the incision 14 of the outer sleeve 12 does not register with the projection 16 of the ring.

The ring 7 fitting the outer sleeve 12 is eccentrically mounted with regard to the nut 5 so that only a few of the teeth of the ring 7 engage the teeth of the nut 5. The rotation of the chuck spindle and the chuck causes the rotation of the outer sleeve 12, the ring 7, the nut 5 and jaws 3 but if the outer sleeve is stopped, and the chuck spindle continues to rotate the ring 7 will execute an eccentric movement on the inner surface of the eccentric rib 13 and will impart by means of its internal teeth a rotary motion to the nut 5 whereby the disk 4 will be displaced in axial direction and the clamping jaws will be moved inwardly.

This in the jaw closing operation. It is evident that relatively strong clamping pressure may be produced with a comparatively slight force exerted upon the outer sleeve, owing to the eccentric drive and to the eccentric transmission by way of the eccentric drive, the inner thread of the nut 5 and the wedge movement of the clamping jaws. To clamp a rod in a machine or to clamp a drill in the drilling machine spindle with the aid of the chuck it is merely necessary to insert with one hand the piece to be clamped into the opening of the chuck while the machine is running and with the other hand to stop the outer sleeve 12 for a moment so that the hereinbefore described eccentric movement of the ring 7 takes place whereby the piece is clamped securely in position. The outer sleeve is now moved axially toward the main part 1 (to the right in Fig. 1), until the nose 9 of the latter enters the incision 10 of the ring 7 moved in the same direction and abuts the projection 11. Thus the ring 7 is linked to the main part 1 and cannot become loose during rotation by vibrations or the like.

For releasing the piece of work it is merely necessary to uncouple the nose 9 from the projection 11 of the ring 7 by displacing the outer sleeve in the direction of the arrow 17 to the position shown in Fig. 1 so that the ring 7 may no longer participate in the movement of the main part 1. By further displacement in this direction the outer sleeve 12 is coupled with the ring 7 as the rotating projection 16 engages with the incision 14 of the outer sleeve 12 as soon as both are arranged in registration. A pin 18 is provided which limits the engagement of the projection 16 with the incision. By the operation mentioned the outer sleeve 12 is united with the ring 7 and with the nut 5 engaging with said ring and, if the outer sleeve is now held while the chuck revolves the disk 4 screws back in the stationary nut so that the clamping jaws are opened. During this opening movement the eccentric drive is not in operation and the releasing is effected much more rapidly than the jaw clamping operation, which is especially advantageous.

The parts above described are covered by a cap 19 screwed upon the outer end of the reduced portion 2 of the body or main part 1. By a stud 20 which is inserted and which reaches into the main part 1 the disk 4 is secured against revolving so that it is bound to execute in the nut 5 the movement in the longitudinal direction which has been described.

This improved chuck can be used for various purposes, such as holding a rod in automatic machine tools, for clamping drills, chasing tools or the like and it can be used directly for the cutting of threads by means of the jaws which must in this case be of special form, it being immaterial whether the pressure of the jaws is projected inwardly or outwardly.

It is believed in view of the foregoing that a further detailed description of the operation of the invention is unnecessary. It is likewise believed that the advantages of the invention will be readily apparent.

Having thus fully described the invention what is claimed as new and desired to be secured by Letters Patent is:

1. An improved wedge chuck comprising in combination a body, wedge shaped clamping jaws, a disk partly inserted in said clamping jaws and controlling same, a nut surrounding said disk and in threaded engagement therewith for displacing the disk in an axial direction, a pin traversing the body and the disk in axial direction and designed to prevent the disk from rotating, teeth on the outer surface of said nut, a ring eccentrically mounted upon said nut, internal teeth on said ring engaging with the teeth of the nut, an outer sleeve having an eccentric rib in its bore, rotatable on said body and adapted to be displaced upon said body in an axial direction, means on the outer surface of the said ring to be engaged by the eccentric rib of the outer sleeve for longitudinally shifting the ring when the outer sleeve is axially displaced and means for coupling said ring with the body to lock the jaws in closed position.

2. An improved wedge chuck comprising in combination a body, wedge shaped clamping jaws, a disk partly inserted in said clamping jaws, and controlling same, a nut surrounding said disk and in threaded engagement therewith for displacing the disk in an axial direction, a pin traversing the body and the disk in an axial direction designed to prevent the disk from rotating, teeth in the outer surface of said nut, a ring eccentrically mounted upon said nut, internal teeth on said ring engaging with the teeth of the nut, a flange at the one edge and a projection at the other edge of the ring, the flange having recesses forming a tooth therebetween, an outer sleeve having an eccentric rib in the bore fitting between said flange and said projection on the ring and a nose in the body for acting upon the tooth in the recesses of the flange for coupling the body with the ring and thereby locking the nut with the jaws in closed position when the outer sleeve is displaced in longitudinal direction.

3. An improved wedge chuck comprising in combination a body, wedge shaped clamping jaws, a disk partly inserted in said clamping jaws and controlling same, a nut surrounding said disk and in threaded engagement with the disk for displacing the disk in an axial direction, a pin traversing the body and the disk in an axial direction and designed to prevent the disk from rotating, teeth in the outer surface of said nut, a ring eccentrically mounted upon said nut, internal teeth on said ring engaging with the teeth of the nut, a flange at the one edge and a projection at the other edge of the ring, an outer sleeve having an eccentric rib in its bore fitting between said flange and said projection on the ring, said eccentric rib being provided with a groove designed to receive the projection of the ring when the outer sleeve is displaced in longitudinal direction for coupling it with the said ring so that stopping of the outer sleeve will cause rotation of the nut in a direction opposite to that in which the body was rotating and thus operate to open the jaws In testimony whereof we affix our signatures in presence of two witnesses.

PAUL SCHULZ.
JULIUS JAKOWITSCH.

Witnesses:
T. ED. LEVY,
WITFOELL REECHL.